INVENTORS
THOMAS C. BOUR and
ROBERT G. SHEALY
BY
ATTORNEYS

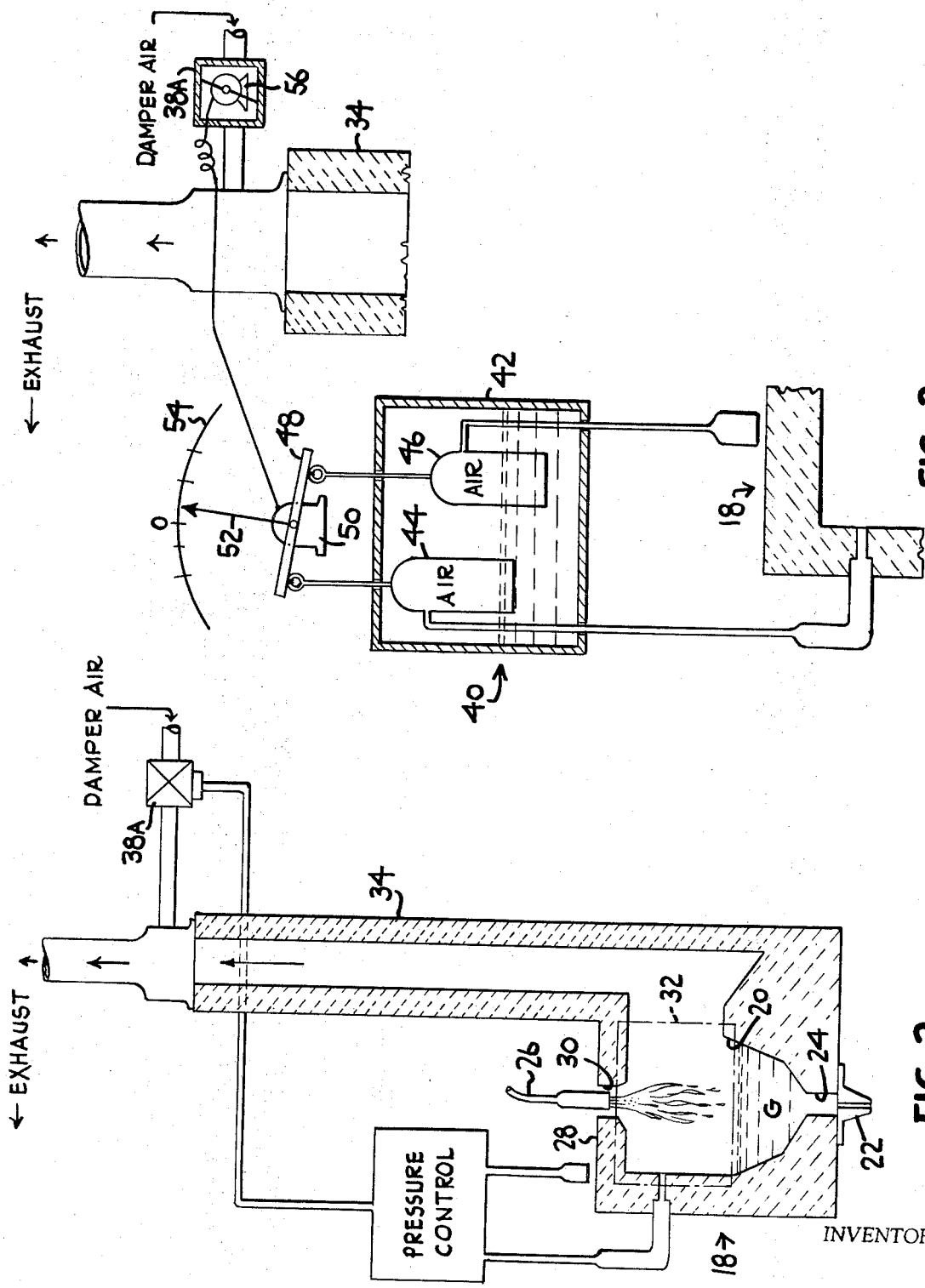

United States Patent Office 3,535,096
Patented Oct. 20, 1970

3,535,096
DIFFERENTIAL PRESSURE CONTROL IN MANUFACTURE OF FIBER GLASS FIBERS
Thomas C. Bour, Allison Park, Pa., and Robert G. Shealy, Shelby, N.C., assignors to PPG Industries, Inc., a corporation of Pennsylvania
Filed Sept. 14, 1967, Ser. No. 667,699
Int. Cl. C03b 37/02
U.S. Cl. 65—2                                     5 Claims

ABSTRACT OF THE DISCLOSURE

A substantially uniform positive pressure differential on the order of 0.02 to 0.20 inch water column, is maintained between the atmosphere above the glass in the forehearth of a fiber forming arrangement and the ambient atmosphere.

BACKGROUND OF THE INVENTION

This invention relates to the manfacture of glass fibers and particularly to an improved process for such manufacture in which one of the variable conditions is controlled.

In the process of manufacturing glass fibers, as by the continuous melting process, glass is melted in a tank, refined, and delivered to a forehearth in which one or more fiber-forming bushings are located. The forehearth may, with the refiner, form a T, and generally there are a plurality of fiber-forming bushings located therein. Each bushing is provided with a plurality of orificed tips through which glass passes as individual streams which are continuously attenuated into fine fibers. The attenuating force is supplied by a winder having a driven cylinder onto which the fibers are collected. Generally a head of glass is maintained over the bushings and preferably the head is substantially the same for each bushing. The head of glass may be on the order of 8 inches in depth and glass is supplied to the forehearth at such rate that the head of glass is substantially the same at all times during the fiber-forming process. Above the glass in the forehearth, an atmosphere of combustion products is maintained; generally this atmosphere is separated from that over the melter and refiner, and also from the ambient surrounding the forehearth. Without control, the pressure differential between the atmosphere in the forehearth above the glass and the ambient varies.

SUMMARY OF THE INVENTION

In accordance with this invention, the pressure of the atmosphere above the glass in the forehearth is greater than the ambient pressure outside the forehearth, and the pressure differential between the atmosphere above the glass in the forehearth and the ambient atmosphere is a positive value which is maintained substantially constant. It is known that uniformity of variables leads to uniformity of product; and it is known that the product produced is more uniform when using the teachings of this invention; however, it is not known why the product is improved other than the reason given.

The magnitude of pressure difference is probably not as important as the uniformity of pressure differential. Generally it is desirable to operate at a relatively low positive pressure differential, as for example, between 0.02 inch to 0.20 inch water column (0.012 to 0.117 ounce per square inch). This pressure is small as compared with the usual head of glass, as for example, a depth of glass in the forehearth of eight inches which, at the bushing level supplies a pressure of approximately 0.74 pound per square inch which is equivalent to a water column of 20.4 inches. Thus the positive pressure differential of the forehearth atmosphere is probably always less than one percent of the glass head pressure, and supplies little extrusion pressure on the glass.

The desired pressure differential is controlled automatically by a pressure controller and any correction in the pressure above the glass in the forehearth is made in response to the control mechanism.

BRIEF DESCRIPTION OF THE DRAWINGS

FIG. 2 is a sectional view of the forehearth and stack, showing schematically the forehearth pressure control systems; and FIG. 3 is an illustration of a typical pressure controller or comparer usable in the pressure control system of this invention.

DESCRIPTION OF THE PREFERRED EMBODIMENT

Figure 1:
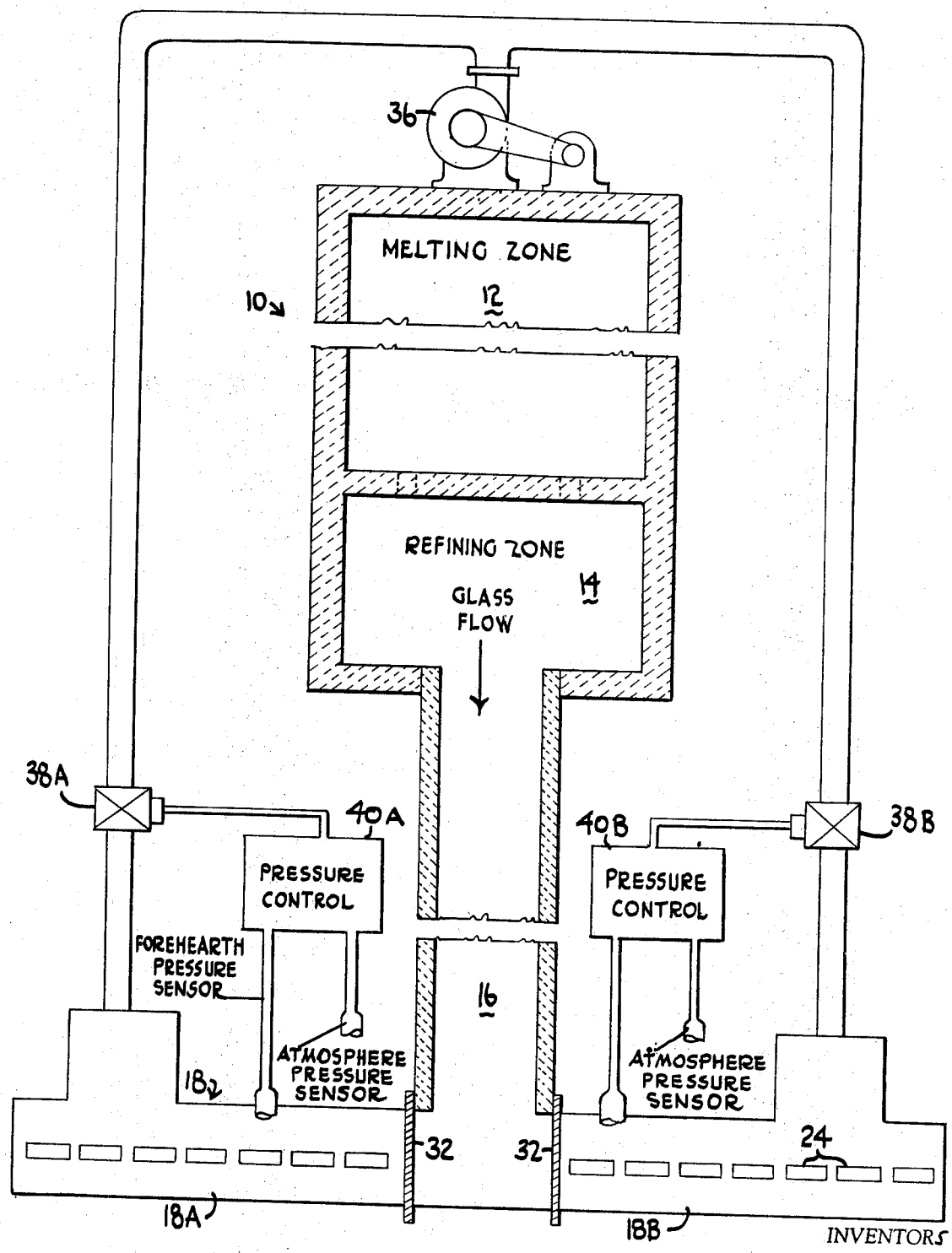
FIG. 1 is a plan view of a fiber glass forehearth and glass tank, and indicating schematically the forehearth pressure control system.

In the drawings, especially FIGS. 1 and 2, there is illustrated a continuous fiber glass melting tank, identified as 10, having a melting zone 12 and a refining zone 14 from which glass flows through a canal 16 to a forehearth 18. The forehearth is constructed to include a trough-like receptacle 20 to receive and contain molten glass G delivered from the refiner 16. At spaced intervals along the bottom of the forehearth are disposed fiber glass bushings 22 which communicate with the receptacle 20 by passages 24. The bushings 22 are conventional in construction, having orifices through which molten glass passes as fine streams to be attenuated into fibers. Because the bushing is conventional in construction, no further description is considered necessary.

In order that the glass G be maintained with the degree of fluidity, a plurality of burners 26 are located in the roof 28 of the forehearth, passing through openings 30 therein, so as to direct their products of combustion downwardly toward the glass. The atmosphere from the melting tank, refiner and canal is effectively isolated from that over the glass G in the forehearth by means of baffles 32 which span the forehearth at the canal location and which are spaced just slightly above and out of contact with the level of the glass G, so as to avoid contamination of the already refined glass. If slight contamination of the glass can be tolerated, or if contamination must be avoided and a non-reacting material such as platinum is used, the baffles can be positioned such that their bottom edges extend below the glass surface. This provides a more positive separation of atmospheres, but adequate control can be maintained with a slight opening (less than ½ inch) between glass surface and baffle.

To exhause the atmosphere above the glass G in the forehearth, stacks 34 are provided at the opposite ends of the forehearth. In order to maintain a positive pressure above the glass G in the forehearth, and also the pressure differential before described, however, small, the exhaust from each stack is controlled by means of an air damper. Separate controls are provided because, as the embodiment has been described, each leg 18A or 18B of the forehearth is isolated atmospherically from each other by the baffles 32.

Pressure variations in the forehearth can occur as a result of pressure variations in the upstream zones of the tank, if the forehearth atmosphere is not isolated from the upstream zones. When the forehearth atmosphere is isolated from the upstream zones, as by baffles 32, pressure variations can still occur in the forehearth as a result of changes in the firing rate of the forehearth burners, which respond to a temperature sensor and controller. Thus, in order to provide a constant pressure above the glass, it becomes necessary to control the exhaust from the stacks 34. This is accomplished by providing a variable source of damping air, such as a blower 36, supplying air through motor-driven adjustable valves 38A, 38B in response to a pressure sensor and controller 40A, 40B.

Each pressure controller is connected by pipes or the like to its leg of the forehearth and also to the ambient atmosphere as illustrated and as below described.

A typical pressure sensor 40 is illustrated in FIG. 3. This sensor includes a container 42 filled with oil into which a pair of bells 44, 46 are partially submerged, such that air is trapped therein. The bells are suspended from a lever 48 pivoted about the shaft of a servo-motor 50 and a pointer 52 is fixed to the shaft. The interior of the bell 44 is connected to the forehearth 18 by a tube, pipe or the like, and the interior of the bell 46 is similarly connected to the ambient atmosphere. Changes in the pressure differential between these two atmospheres will vary the relationship of the bells in the oil and vary the position of the pointer 52. A properly calibrated dial 54 indicates the pressure differential. The servo-motor 50 is connected to a servo-motor 56 connected, as the case may be, to the valve 38A or 38B for control of damping air into the exhaust stack. Thus change in pressure differential is indicated by a change in pointer position and correction is made by the use of damping air. It is thus possible to maintain the pressure differential substantially constant and improve the stability of the fiber forming process.

This invention is applicable not only to the continuous strand process, but also to the superfine process wherein primary fibers are further attenuated into discontinuous fibers. Also, a marble melt furnace can be substituted for the continuous batch-melting furnace described.

What is claimed is:

1. In apparatus for producing glass fibers which includes a glass melting tank, a forehearth connected to the glass tank, a plurality of bushings located in said forehearth to receive molten glass from the forehearth, a head of glass over said bushings and an atmosphere thereover in said forehearth, means for withdrawing glass from the bushings to form fibers, means to substantially isolate the atmosphere above the tank from the atmosphere above the forehearth, means for supplying combustion gases to said forehearth atmosphere, and means for withdrawing gases from said forehearth atmosphere, the improvement which comprises means for maintaining a substantially constant positive pressure differential between the atmosphere above the glass in said forehearth and the ambient atmosphere, said means comprising means to compare the pressures of said atmospheres and means responsive to said comparing means to adjust the forehearth atmosphere pressure to achieve said pressure differential.

2. In apparatus as recited in claim 1 further including multiple legs to said forehearth, and means to isolate the atmosphere above forehearth legs from each other.

3. In apparatus as recited in claim 1, further including a forehearth atmosphere pressure sensor, an ambient atmosphere pressure sensor, means to compare the pressures of said atmospheres, damping means to control said forehearth atmosphere pressure maintain said pressure differential and means responsive to said means to compare the pressures of said atmospheres to control said damping means.

4. In a method of producing glass fibers which includes supplying molten glass to a forehearth having a plurality of bushings therein with a constant head of glass over them and an enclosed atmosphere over the glass, withdrawing glass from the forehearth to form glass fibers and supplying combustion gases to the enclosed atmosphere, the improvement comprising;

measuring the pressure of the forehearth atmosphere and the ambient atmosphere and in response to said measuring, adjusting the differential in order to maintain said differential constant.

5. In a method as recited in claim 4 wherein said pressure differential is maintained from 0.02 to 0.20 inch of water.

References Cited

UNITED STATES PATENTS

| | | | |
|---|---|---|---|
| 3,035,371 | 5/1962 | Mouly et al. | 65—161 |
| 3,300,288 | 1/1967 | Matthews | 65—2 |
| 3,373,007 | 3/1968 | Ticknor | 65—161 |
| 3,410,672 | 11/1968 | Lajarte | 65—2 |

S. LEON BASHORE, Primary Examiner

ROBERT L. LINDSAY, JR., Assistant Examiner

U.S. Cl. X.R.
65—11, 29, 158, 161